United States Patent
Gagne

(10) Patent No.: US 8,973,868 B2
(45) Date of Patent: Mar. 10, 2015

(54) AIRBORNE COOLING SYSTEM

(75) Inventor: Steven Gagne, Avon, IN (US)

(73) Assignee: Rolls Royce North American Technologies, Inc., Indianapolis, IN (US)

(*) Notice: Subject to any disclaimer, the term of this patent is extended or adjusted under 35 U.S.C. 154(b) by 414 days.

(21) Appl. No.: 13/432,482

(22) Filed: Mar. 28, 2012

(65) Prior Publication Data

US 2012/0256045 A1    Oct. 11, 2012

Related U.S. Application Data

(60) Provisional application No. 61/468,296, filed on Mar. 28, 2011.

(51) Int. Cl.
| | | |
|---|---|---|
| *B64D 33/10* | (2006.01) | |
| *B64D 1/08* | (2006.01) | |
| *F42B 15/34* | (2006.01) | |
| *B64D 13/06* | (2006.01) | |

(52) U.S. Cl.
CPC . *B64D 1/08* (2013.01); *F42B 15/34* (2013.01); *B64D 33/10* (2013.01); *B64D 2013/0674* (2013.01)
USPC .............. 244/57; 244/129.1; 165/44; 165/42; 62/241

(58) Field of Classification Search
USPC .................. 244/57, 129.1; 165/44, 42, 43, 41; 62/241, 239
See application file for complete search history.

(56) References Cited

U.S. PATENT DOCUMENTS

| 1,730,111 | A | * | 10/1929 | Barlow | 244/57 |
|---|---|---|---|---|---|
| 2,902,597 | A | | 9/1959 | Leidy et et. | |
| 3,804,353 | A | * | 4/1974 | Scott et al. | 244/57 |
| 4,031,710 | A | | 6/1977 | Rideout | |
| 4,209,993 | A | | 7/1980 | Rannenberg | |
| 4,494,384 | A | | 1/1985 | Lott | |
| 4,674,704 | A | | 6/1987 | Altoz et al. | |
| 5,025,634 | A | | 6/1991 | Dressler | |

(Continued)

FOREIGN PATENT DOCUMENTS

| EP | 0 362 796 | | 4/1990 | |
|---|---|---|---|---|
| EP | 1 384 967 | | 1/2004 | |
| GB | 456335 | A * | 11/1936 | B64D 33/10 |

OTHER PUBLICATIONS

International Search Report and Written Opinion, Jun. 20, 2012, PCT/US2012/030872.

(Continued)

*Primary Examiner* — Christopher P Ellis
(74) *Attorney, Agent, or Firm* — Krieg DeVault LLP

(57) ABSTRACT

An aircraft having a cooling system is disclosed. The cooling system can be used to cool a heat emitting component. In one form the cooling system is a refrigerant system and includes a relatively high temperature device such as, but not limited to, a condenser. The relatively high temperature component is placed in thermal communication with a passing air flow. In one embodiment the aircraft includes a pod in which at least a portion of the cooling system is disposed. For example, a condenser of a vapor cycle refrigerant system can be located in the pod and in thermal communication with the air flow. The cooling system can also include a device capable of delivering a cooling fluid into the air flow and/or to the relatively high temperature component. The cooling fluid can be evaporated to provided additional cooling.

20 Claims, 2 Drawing Sheets

(56) References Cited

U.S. PATENT DOCUMENTS

| | | | |
|---|---|---|---|
| 5,097,892 A * | 3/1992 | Beamer | 165/44 |
| 5,129,446 A | 7/1992 | Beamer | |
| 5,148,859 A | 9/1992 | Beamer | |
| 5,644,608 A | 7/1997 | Malik et al. | |
| 5,802,860 A | 9/1998 | Barrows | |
| 5,899,085 A * | 5/1999 | Williams | 62/236 |
| 6,000,210 A | 12/1999 | Negulescu | |
| 6,182,435 B1 * | 2/2001 | Niggemann et al. | 60/772 |
| 6,658,881 B1 * | 12/2003 | Plattner | 62/239 |
| 6,948,331 B1 * | 9/2005 | Ho | 62/401 |
| 7,484,354 B2 | 2/2009 | Stretton | |
| 8,127,758 B2 * | 3/2012 | Atreya et al. | 126/573 |
| 8,636,051 B2 * | 1/2014 | Weber et al. | 165/44 |
| 2004/0129014 A1 | 7/2004 | Richman et al. | |
| 2006/0061107 A1 | 3/2006 | Cadaret | |

OTHER PUBLICATIONS

Extended European Search Report, EP 12765288.1, Rolls-Royce North American Technologies, Inc., Nov. 26, 2014.

* cited by examiner

AIRBORNE COOLING SYSTEM

CROSS REFERENCE

The present application claims the benefit of U.S. Provisional Patent Application No. 61/468,296, filed Mar. 28, 2011, which is incorporated herein by reference.

TECHNICAL FIELD

The present invention generally relates to aircraft heat exchangers, and more particularly, but not exclusively, to aircraft cooling systems.

BACKGROUND

Providing cooling on board aircraft for relatively high temperature devices remains an area of interest. Some existing systems have various shortcomings relative to certain applications. Accordingly, there remains a need for further contributions in this area of technology.

SUMMARY

One embodiment of the present invention is a unique aircraft cooling system. Other embodiments include apparatuses, systems, devices, hardware, methods, and combinations for cooling relatively high temperature devices. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
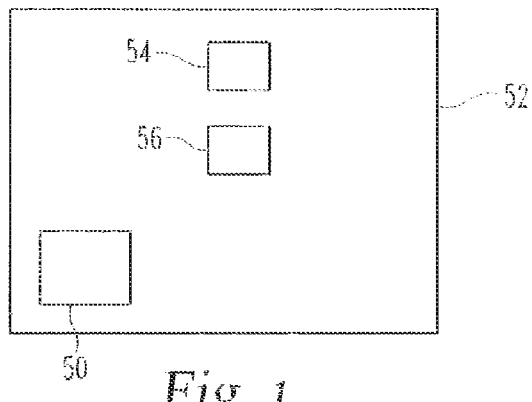
FIG. 1 depicts one embodiment of an aircraft.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of an aircraft engine 50 used as a powerplant for an aircraft 52. The engine 50 can be any device useful for providing propulsion to the aircraft 52 and in one non-limiting form is an internal combustion engine. The engine 50 can take on a variety of types including, but not limited to, a gas turbine engine or a piston driven engine. Though the engine 50 is depicted as internal to the aircraft 52, other locations are also contemplated herein. For example, the engine 50 can be coupled to the aircraft 52 via an external pylon. More than one engine 50 can be used to provide propulsion to the aircraft 52. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. The aircraft 52 may operate at a variety of speeds and includes a sensor 54 and controller 56.

The sensor 54 measures aircraft flight condition such as speed and altitude, to set forth just two non-limiting examples, and can output any variety of data whether sensed or calculated. For example, the sensor 54 can sense and output conditions such as static temperature, static pressure, total temperature, and/or total pressure, among possible others. In one form the sensor 54 is capable of measuring a temperature of a flow stream at a location such as an inlet to a passageway, or at a location downstream of the inlet. The flight condition sensor 54 can output calculated values such as, but not limited to, equivalent airspeed, altitude, and Mach number. Any number of other sensed conditions or calculated values can also be output. In one non-limiting form, the flight condition sensor 54 provides data to the controller 56 and can output values in either analog or digital form. In still other non-limiting forms the sensor 54 can output information to a display which can be evaluated by an operator on board the aircraft 50.

The controller 56 is provided to monitor and control an aircraft operation, and in one form can monitor and control a variety of aircraft operations and conditions. The controller 56 can be comprised of digital circuitry, analog circuitry, or a hybrid combination of both of these types. Also, the controller 56 can be programmable, an integrated state machine, or a hybrid combination thereof. The controller 56 can include one or more Arithmetic Logic Units (ALUs), Central Processing Units (CPUs), memories, limiters, conditioners, filters, format converters, or the like which are not shown to preserve clarity. In one form, the controller 56 is of a programmable variety that executes algorithms and processes data in accordance with operating logic that is defined by programming instructions (such as software or firmware). Alternatively or additionally, operating logic for the controller 56 can be at least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art. It should be appreciated that controller 56 can be exclusively dedicated to control of a cooling system associated with the aircraft 50 (discussed further below), or may further be used in the regulation/control/activation of one or more other subsystems or aspects of aircraft 50.

Figure 2:
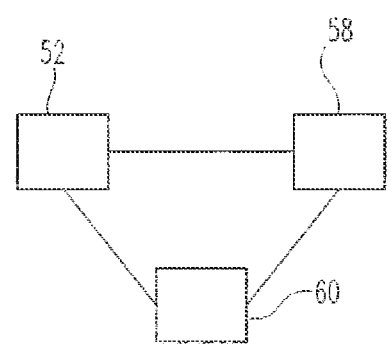
FIG. 2 depicts one embodiment of an aircraft.

Turning now to FIG. 2, one embodiment is depicted of the aircraft 52 having a heat emitting component 58 and a cooling system 60 structured to provide cooling to the component 58. Both the heat emitting component 58 and the cooling system 60 can be coupled to the aircraft 52 at a variety of locations either internal or external to the aircraft 52. For example, the heat emitting compoentn 58 and cooling system 60 can both be external, both be internal, or one can be internal while the other is external. Although a single heat emitting component 58 and a single cooling system 60 is depicted, other embodiments can include greater numbers of component 58 or system 60, or both.

The heat emitting component 58 can take a variety of forms and can emit heat in a variety of ways. The heat can take the form of radiant and convective heat, to set forth just one non-limiting possibility, and in some applications can be capable of causing damage if not adequately absorbed and/or dissipated through or with the assistance of the cooling system 60. In one non-limiting embodiment the heat emitting component 58 is part of a mechanism capable of generating heat at selective portions of an aircraft 52 flight. For example, the mechanism can be part of a weapon delivery system that is deployed when activated by an operator. In one particular non-limiting form the heat emitting component 58 can be part of a weapon system such as, but not limited to, a directed energy weapon.

Figure 3:
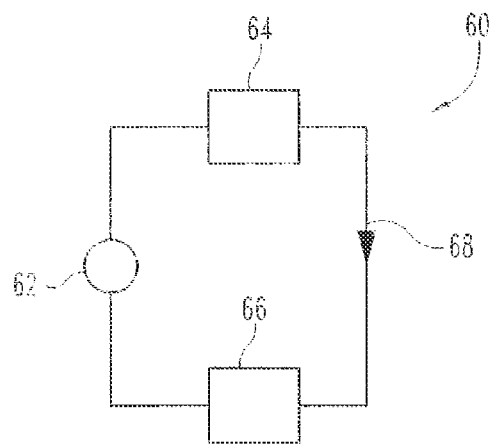
FIG. 3 depicts one embodiment of a cooling system.

The cooling system 60 is in thermal communication with the heat emitting component 58 and can take any variety of forms such as, but not limited to, refrigeration cooling. In one non-limiting form the cooling system 60 is a cyclic refrigeration system which can take the form of a vapor compression cycle. One embodiment of the cooling system 60 is depicted in FIG. 3 in the form of a vapor compression cycle which utilizes components such as a compressor 62, condenser 64, and evaporator 66. The compressor 62 is used to pressurize a working fluid 68 which results in a corresponding increase in temperature of the working fluid 68. After being pressurized by the compressor 62 the working fluid 68 is conveyed via a passage to the condenser 64 which is used to withdraw heat from the working fluid 68 and in some cases condense it to a liquid state. In some forms the passage that conveys the working fluid 68 can simultaneously be used as the condenser 64. Some devices, such as fins, can be coupled with the passage and/or condenser 64 to assist in withdrawing heat from the working fluid 68. As used herein, the term "passage" includes any variety of spaces suitable for conveying a fluid. The spaces can have any size, shape, orientation, etc. and can be capable of flowing fluids at a variety of pressures, temperature, and flow rates, from relatively high to relatively low.

The evaporator 66 receives the compressed working fluid 68 via a passage and expands the working fluid 68 to a relatively low temperature. The evaporator 66 is in thermal communication with and receives heat from the heat emitting component 58. The evaporator 66 can be in direct contact with the heat emitting component 58 or can be positioned some distance from it. In some applications additional devices may be coupled between the evaporator 66 and the heat emitting component 58 which can be used to convey heat between the two. In some forms a flow of gaseous composition, possibly air, can be moved between the evaporator 66 and the heat emitting component 58 to transfer heat between the two.

Figure 4:
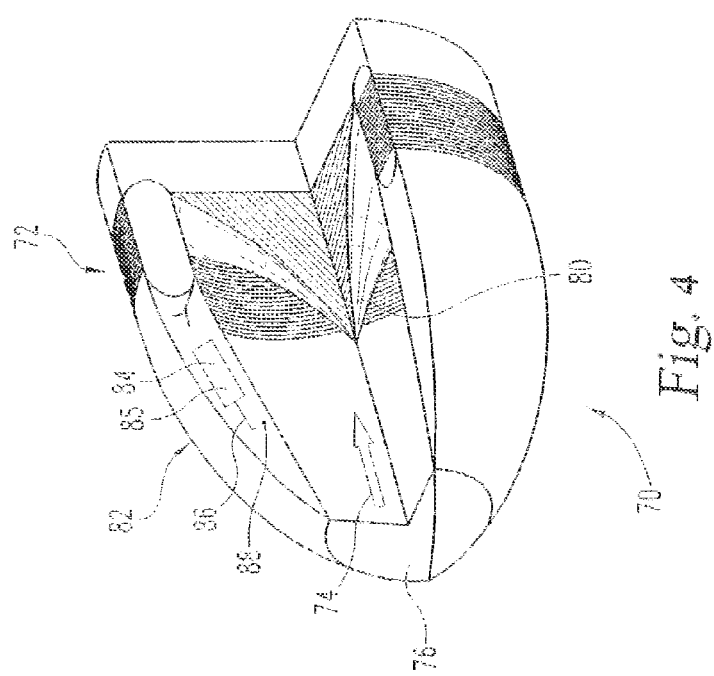
FIG. 4 depicts one embodiment of an aircraft pod.

Turning now to FIG. 4, an embodiment is shown of a pod 70 having a relatively high temperature component 72 of the cooling system 60. The pod 70 of the illustrated embodiment is coupled to the aircraft 52 and located such that it projects into a free stream. The pod 70 can be releasably coupled to the aircraft 52 or can be permanently affixed thereto. In one form the pod 70 includes a shape similar to an external fuel tank. The pod 70 can be located beneath a wing or a centerline of an aircraft, among other possible locations. The pod 70 can have a leading edge and a trailing edge and in one form has a symmetric shape about one or more axes or planes. In other embodiments the pod 70 need not be symmetric. The pod 70 can take a variety of forms and need not be entirely exposed to the free stream such as an external fuel tank is exposed. In some embodiments the pod 70 can take the form of a conformal fuel tank used on some types of aircraft to increase a load carrying capacity. Such a conformal structure need not be exposed to the free stream as some external fuel tanks are exposed. The relatively high temperature component 72 of the cooling system 60 can be located in any space of the aircraft 52, whether or not that space is associated with the pod 70.

In one non-limiting embodiment the relatively high temperature component 72 is the condenser 64. The relatively high temperature component 72 is in thermal communication with and transfers heat to an airflow 74 received into the pod 70 via an inlet 76. The inlet 76 is depicted on a forward portion of the pod 70, but in other embodiments the inlet 76 can be located in other areas. To set forth just a few non-limiting examples, the inlet 76 can be located on a lateral side of the pod, an aft portion of the pod, and/or on the bottom. In one form the inlet 76 can have a moveable member that can be used to open and/or close the inlet 76.

In the illustrated embodiment the inlet 76 leads to a passage 78 upstream of the high temperature component 72. The passage 78 can take a variety of shapes and can have a variety of cross sectional areas. In one form the cross sectional area of the passage 78 changes from an upstream end of the passage 78 to a downstream end. To set forth just one non-limiting embodiment, the passage 78 can take the form of a diffuser.

The passage 78 can be formed by a flow director 80 which can take a variety of forms. In the illustrated embodiment the flow director is conical in shape. In some forms the flow director 80 can be used to receive air flow in one direction and turn it to another such as in the illustrated embodiment in which an axial flow is turned radially. Not all embodiments need to change direction of the air flow 74 within the pod 70. In addition, the pod 70 can include structures that turn the airflow in directions other than those depicted.

The relatively high temperature component 72 is located at a downstream end of the passage 78. In one form the component 72 is located adjacent to the exterior of the pod 70 such that the air flow 74 exits the pod upon passage of the component 72. While the air flow 74 can come into direct contact with the high temperature component 72, in some forms a device such as a heat conductive material can be interposed between the two. The high temperature component 72 can take a variety of shapes including the annular configuration depicted in the illustrated embodiment. In some forms the component 72 can be partially annular. The high temperature component can be segmented in some applications. More than one component 72 can be used. The high temperature component 72 can include passages such that the air flow 74 is split into multiple streams as it passes around and/or through the component 72. In some applications material coupled with the high temperature component 72 can protrude into the air flow 74. For example, fins can be affixed to the component 72 to aid in heat transfer from the component 72 to the air flow 74.

The pod 70 can also include a supplemental cooling system 82 as part of the cooling system 60 and is capable of transferring heat through a phase change of a cooling fluid 85 introduced into the passage 78 with the air flow 74 and/or the relatively high temperature component 72. The cooling system 82 includes a source 84 of cooling fluid 85 shown disposed in a space internal to the pod 70. In other embodiments, however, the source 84 can be located elsewhere in the aircraft 52, such as in an aft portion of the pod 70, to set forth just one non-limiting example. The source 84 is connected to a flow passage 86 structured to deliver the cooling fluid 85 to the passage 78 via an aperture 88. The cooling fluid 85 can take a variety of forms such as, but not limited to, a liquid. The cooling fluid 85 can also have a variety of compositions such as, but not limited to, water, alcohol, and others, and mixtures/combinations thereof. The cooling fluid 85 can be maintained at a temperature prior to deliver to the passage 78. Some embodiments of the cooling system 82 can additionally include a pump capable of delivering the cooling fluid 85 to the passage 78. In some forms a source of pressurized air can be used to increase a pressure, such as a pressure within the source 84, to deliver the cooling fluid 85 to the passage 78.

The aperture 88 through which the cooling fluid 85 is introduced into the passage 78 can take a variety of forms such as a circular shaped opening or an elongate slot. In some applications multiple apertures 88 can be disposed around the passage 78. The apertures 88 can be connected to one or more sources 84. Furthermore, the apertures 88 can be located anywhere relative to the passage 78. The apertures 88 can also be located to emit the cooling fluid 85 onto the relatively high temperature component 72, or a structure in thermal communication with the relatively high temperature component 72. The cooling fluid 85 can be discharged from the apertures 88 at a variety of angles, flow rates, temperatures, and pressures.

Once delivered to the passage the cooling fluid 85 can exchange heat with the air flow 74. In some applications the cooling fluid 85 absorbs heat from the air flow 74 and in some situations is sufficient to cause the cooling fluid 85 to change phase. Such a phase change can further lower the temperature of the air flow 74. In some applications, furthermore, not all of the cooling fluid 85 changes phase prior to encountering the high temperature component 72 disposed in thermal communication with the passage 78. In such cases the cooling fluid 85 can adhere to a surface of the component 72 or a structure that is in thermal communication with the component 72.

In some modes of operation the relatively high temperature component 72 can be cooled by the air flow 74 through the passage 78. In other modes of operation the supplemental cooling system 82 can be used to further cool the air flow 74 and/or the high temperature component 72 through a phase change of a fluid dispersed into a flow stream.

Figure 5:
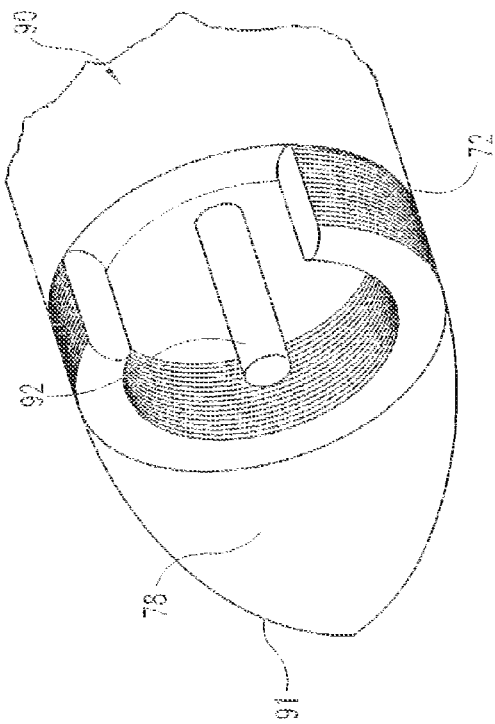
FIG. 5 depicts one embodiment of an aircraft pod.

Turning now to FIG. 5, one embodiment of the instant application includes the pod 70 having the relatively high temperature component 72 and a turbine 90. It will be appreciated that the pod 70 of FIG. 5 includes all of the variations of the pod 70 such as variations in any of the components of the pod 70 like the supplemental cooling system 82, high temperature component 72, passage 78, etc. A movable nose cone 91 can be provided to open and/or close the inlet to the passage 78. The turbine 90 can be used to extract work from the air flow 74 and provide work to an aircraft device. In one non-limiting example the turbine 90 can provide work to the compressor 62 of the cooling system 60. Other aircraft devices can also be powered by the turbine 90. An air inlet device 92 can be provided in some embodiments to project into the passage 78 and capture the air flow 74 before delivering it to the turbine 90. The air inlet device 92 can have a variety of shapes and sizes.

In other embodiments, the turbine 90 can be configured to receive air from another source, e.g., bleed air from one or more of the aircraft engines 50. In some embodiments, a combustor can be located upstream of the turbine 90. In still further embodiments, a compressor can be located upstream of the combustor and supplied with the air flow from the passage 78.

In one embodiment an aircraft having a cooling system is disclosed. The cooling system can be used to cool a heat emitting component. In one form the cooling system is a refrigerant system and includes a relatively high temperature device such as, but not limited to, a condenser. The relatively high temperature component is placed in thermal communication with a passing air flow. In one embodiment the aircraft includes a pod in which at least a portion of the cooling system is disposed. For example, a condenser of a vapor cycle refrigerant system can be located in the pod and in thermal communication with the air flow. The cooling system can also include a device capable of delivering a cooling fluid into the air flow and/or to the relatively high temperature component. The cooling fluid can be evaporated to provide additional cooling.

One aspect of the present application includes an apparatus comprising an aircraft having a powerplant operable to provide thrust and propel the aircraft at a flight speed, the aircraft including an external store extending from the aircraft, a cooling system coupled with the aircraft and capable of providing a cooling to a heat emitting component, the cooling system conveying heat from the heat emitting component to a heat rejecting component structured to exchange heat with a working fluid, the heat rejecting component located with the external store, and a fluid discharge member in fluid communication with the cooling system and having an opening through which an evaporative liquid is discharged into the working fluid, the evaporative cooling liquid capable of being evaporated to reduce a temperature of the working fluid upstream of the heat emitting component.

One feature of the present application includes the external store is releasably attached to the aircraft.

Another feature of the present application includes wherein the external store is a pod mounted to a wing of the aircraft.

Yet another feature of the present application includes wherein the external store includes an opening through which a slip stream enters, the slip stream forming the working fluid.

A further feature of the present application includes wherein the fluid discharge member includes an opening sized to discharge evaporative cooling liquid in sufficient quantity to be at least partially evaporated prior to contacting the heat rejecting component of the cooling system, wherein the cooling system is a refrigeration system of a vapor compression kind and the heat rejecting component a condenser of the refrigeration system.

A still further feature of the present application includes wherein the external store includes an air passage in communication with a turbine capable of providing energy to an aircraft device.

A yet further feature of the present application includes wherein the cooling system includes a refrigerant compressor and wherein the turbine provides power to the compressor.

Another aspect of the present application includes an apparatus comprising an aircraft having a power plant operable to provide thrust and propel the aircraft at a flight speed, the aircraft including a relatively high temperature device that benefits from a cooling process and a refrigeration system capable of providing a cooling to the relatively high temperature device, the refrigeration system having: a heat providing component in communication with a heat absorbing component via a working fluid that flows from the heat absorbing component to the heat providing component, the heat providing component disposed in thermal communication with a duct having a flow of heat exchange fluid, the heat absorbing component in thermal communication with the relatively high temperature component, a delivery discharge operable to emit a phase transition medium into the duct with the heat exchange fluid, and wherein the heat providing component exchanges heat with the heat exchange fluid and the phase transition medium.

A feature of the present application includes wherein the refrigeration system is a vapor cycle refrigeration system and the heat providing component transfers heat to a mixed flow of the heat exchange fluid and the phase transition medium.

Another feature of the present application includes wherein the refrigeration system is a vapor compression cycle refrigeration system, the heat providing component is a condenser and includes a space to receive the working fluid, and wherein the heat absorbing component is an evaporator.

Yet another feature of the present application includes wherein the heat rejecting component of the refrigeration system is located in a pod exposed to a flow of air that enters an opening in the pod, the flow of air forming the heat exchange fluid.

A further feature of the present application includes wherein the pod includes a turbine and an inlet for admitting a stream to the turbine.

A still further feature of the present application includes wherein the pod includes the duct, the duct receiving the stream from the inlet, and wherein the heat providing component is exposed to the stream flowing through the duct, and wherein the turbine is in fluid communication with a compressor and a combustor.

Yet another feature of the present application includes wherein the phase transition medium is emitted from the delivery discharge in a liquid form and is capable of being at least partially evaporated prior to encountering the heat providing component.

Still another feature of the present application further includes a controller operable to selectively delivery emit a phase transition medium from the delivery discharge.

Yet still another feature of the present application includes wherein the selective emitting is dependent upon a temperature of the heat exchange fluid in the duct.

Yet another aspect of the present application includes an apparatus comprising an aircraft having an external payload container coupled thereto and including an opening arranged to admit an external airflow and a passage for conveying the external airflow to a heat rejecting component of a cooling system, and means for supplementary cooling the heat rejecting component of the cooling system.

A feature of the present application includes wherein the external payload container includes an outer fairing having a shape of an external fuel tank suitable for use on the aircraft.

A further aspect of the present application includes a method comprising operating an aircraft at a flight speed, the aircraft having an external store that includes a heat rejecting component of a heat exchange system, receiving a flow of air into the external store though an inlet, conveying a cooling medium into the flow of air;

changing phase of the cooling medium, and extracting heat from the heat rejecting component disposed wherein the extracting occurs downstream of the inlet.

A feature of the present application includes wherein the changing phase includes a complete phase transfer of all mass of the cooling medium.

Another feature of the present application includes wherein the extracting heat includes transferring heat to the cooling medium and the flow of air.

Still another feature of the present application further includes flowing a working fluid to the heat rejecting component from a heat accepting component, the heat rejecting component and heat accepting component part of a refrigeration system.

Yet another feature of the present application includes wherein the conveying is begun upon a temperature of the flow of air meeting a cooling value.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    an aircraft having a powerplant operable to provide thrust and propel the aircraft at a flight speed, the aircraft including an external store extending from the aircraft;
    a cooling system coupled with the aircraft and capable of providing a cooling to a heat emitting component, the cooling system conveying heat from the heat emitting component to a heat rejecting component structured to exchange heat with a working fluid, the heat rejecting component located with the external store; and
    a fluid discharge member in fluid communication with the cooling system and having an opening through which an evaporative liquid is discharged into the working fluid, the evaporative liquid capable of being evaporated to reduce a temperature of the working fluid upstream of the heat emitting component.

2. The apparatus of claim 1, wherein the external store is releasably attached to the aircraft.

3. The apparatus of claim 2, wherein the external store is a pod mounted to a wing of the aircraft.

4. The apparatus of claim 1, wherein the external store includes an opening through which a slip stream enters, the slip stream forming the working fluid.

5. The apparatus of claim 1, wherein the fluid discharge member includes an opening sized to discharge evaporative cooling liquid in sufficient quantity to be at least partially evaporated prior to contacting the heat rejecting component of the cooling system, wherein the cooling system is a refrigeration system of a vapor compression kind and the heat rejecting component a condenser of the refrigeration system.

6. The apparatus of claim 1, wherein the external store includes an air passage in communication with a turbine capable of providing energy to an aircraft device.

7. The apparatus of claim 6, wherein the cooling system includes a refrigerant compressor and wherein the turbine provides power to the compressor.

8. An apparatus comprising:
    an aircraft having a power plant operable to provide thrust and propel the aircraft at a flight speed, the aircraft including a relatively high temperature device that benefits from a cooling process and a refrigeration system capable of providing a cooling to the relatively high temperature device, the refrigeration system having:
        a heat providing component in communication with a heat absorbing component via a working fluid that flows from the heat absorbing component to the heat providing component, the heat providing component disposed in thermal communication with a duct having a flow of heat exchange fluid, the heat absorbing component in thermal communication with the relatively high temperature device;
    a delivery discharge operable to emit a phase transition medium into the duct with the heat exchange fluid; and wherein the heat providing component exchanges heat with the heat exchange fluid and the phase transition medium; and wherein the heat providing component of the refrigeration system is located in a pod exposed to a flow of air that enters an opening in the pod, the flow of air forming the heat exchange fluid.

9. The apparatus of claim 8, wherein the refrigeration system is a vapor cycle refrigeration system and the heat providing component transfers heat to a mixed flow of the heat exchange fluid and the phase transition medium.

10. The apparatus of claim 9, wherein the refrigeration system is a vapor compression cycle refrigeration system, the heat providing component is a condenser and includes a space to receive the working fluid, and wherein the heat absorbing component is an evaporator.

11. The apparatus of claim 8, wherein the pod includes a turbine and an inlet for admitting a stream to the turbine.

12. The apparatus of claim 11, wherein the pod includes the duct, the duct receiving the stream from the inlet, and wherein the heat providing component is exposed to the stream flowing through the duct, and wherein the turbine is in fluid communication with a compressor and a combustor.

13. The apparatus of claim 12, wherein the phase transition medium is emitted from the delivery discharge in a liquid form and is capable of being at least partially evaporated prior to encountering the heat providing component.

14. The apparatus of claim 8, which further includes a controller operable to selectively emit a phase transition medium from the delivery discharge.

15. The apparatus of claim 14, wherein a signal generated by the controller to selectively emit the phase transition medium is dependent upon a temperature of the heat exchange fluid in the duct.

16. A method comprising:
operating an aircraft at a flight speed, the aircraft having an external store that includes a heat rejecting component of a heat exchange system;
receiving a flow of air into the external store though an inlet;
conveying a cooling medium into the flow of air;
changing phase of the cooling medium to form a reduced temperature flow of air; and
extracting heat from the heat rejecting component disposed wherein the extracting occurs downstream of the inlet and in the presence of the reduced temperature flow of air.

17. The method of claim 16, wherein the changing phase includes a complete phase transfer of all mass of the cooling medium.

18. The method of claim 16, wherein the extracting heat includes transferring heat to the cooling medium and the reduced temperature flow of air.

19. The method of claim 16, which further includes flowing a working fluid to the heat rejecting component from a heat accepting component, the heat rejecting component and heat accepting component part of a refrigeration system.

20. The method of claim 16, wherein the conveying is begun upon a temperature of the flow of air meeting a cooling value.

* * * * *